US012398941B2

(12) United States Patent
Rizzo

(10) Patent No.: US 12,398,941 B2
(45) Date of Patent: Aug. 26, 2025

(54) REFRIGERATING APPLIANCE WITH A FAN AND WITH A PRESSURE SENSOR

(71) Applicant: ELECTROLUX APPLIANCES AKTIEBOLAG, Stockholm (SE)

(72) Inventor: Luca Rizzo, Pordenone (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 268 days.

(21) Appl. No.: 18/012,320

(22) PCT Filed: Jun. 30, 2020

(86) PCT No.: PCT/EP2020/068421
§ 371 (c)(1),
(2) Date: Dec. 22, 2022

(87) PCT Pub. No.: WO2022/002376
PCT Pub. Date: Jan. 6, 2022

(65) Prior Publication Data
US 2023/0213266 A1 Jul. 6, 2023

(51) Int. Cl.
*F25D 17/06* (2006.01)
(52) U.S. Cl.
CPC ........ *F25D 17/065* (2013.01); *F25D 2700/00* (2013.01); *F25D 2700/02* (2013.01); *F25D 2700/12* (2013.01)
(58) Field of Classification Search
CPC .................. F25B 2400/15; F25D 2700/00
See application file for complete search history.

(56) References Cited

U.S. PATENT DOCUMENTS 8,346,398 B2 * 1/2013 Ahmed .............. H05K 7/20836
700/32
9,235,219 B2 * 1/2016 Arunasalam .............. G01F 1/69
(Continued)

FOREIGN PATENT DOCUMENTS

EP 3540343 9/2019
WO WO-2021126958 A1 * 6/2021 ............. G01D 11/00

OTHER PUBLICATIONS

Machine translation of WO2021126958 (Year: 2021).*
International Search Report for PCT/EP2020/068421, dated Mar. 25, 2021, 2 pages.

*Primary Examiner* — Filip Zec
(74) *Attorney, Agent, or Firm* — Chrisman Gallo Tochtrop LLC

(57) ABSTRACT

A refrigerating appliance (100) is provided, which comprises: —at least one storage compartment (110) for storing goods to be refrigerated; —a refrigeration circuit comprising at least one evaporator (170) associated with said at least one storage compartment (110); —a control unit (172) configured to control operation of the refrigerating appliance (100); —at least one fan (171), configured to promote heat exchange between said at least one evaporator (170) and the at least one storage compartment (110), said at least one fan (171) being further configured to be switched between a first operative condition in which said at least one fan (171) is commanded to rotate, and a second operative condition in which said at least one fan (171) is commanded to not rotate; —a MEMS pressure sensor (180) configured to measure the pressure inside said at least one storage compartment (110) and in signal communication with the control unit (172) for providing a pressure signal proportional to the measure of the pressure inside said at least one storage compartment (110), wherein the control unit (172) is configured to control the operation of the refrigerating appliance (100) in function (Continued)

Figure 1:
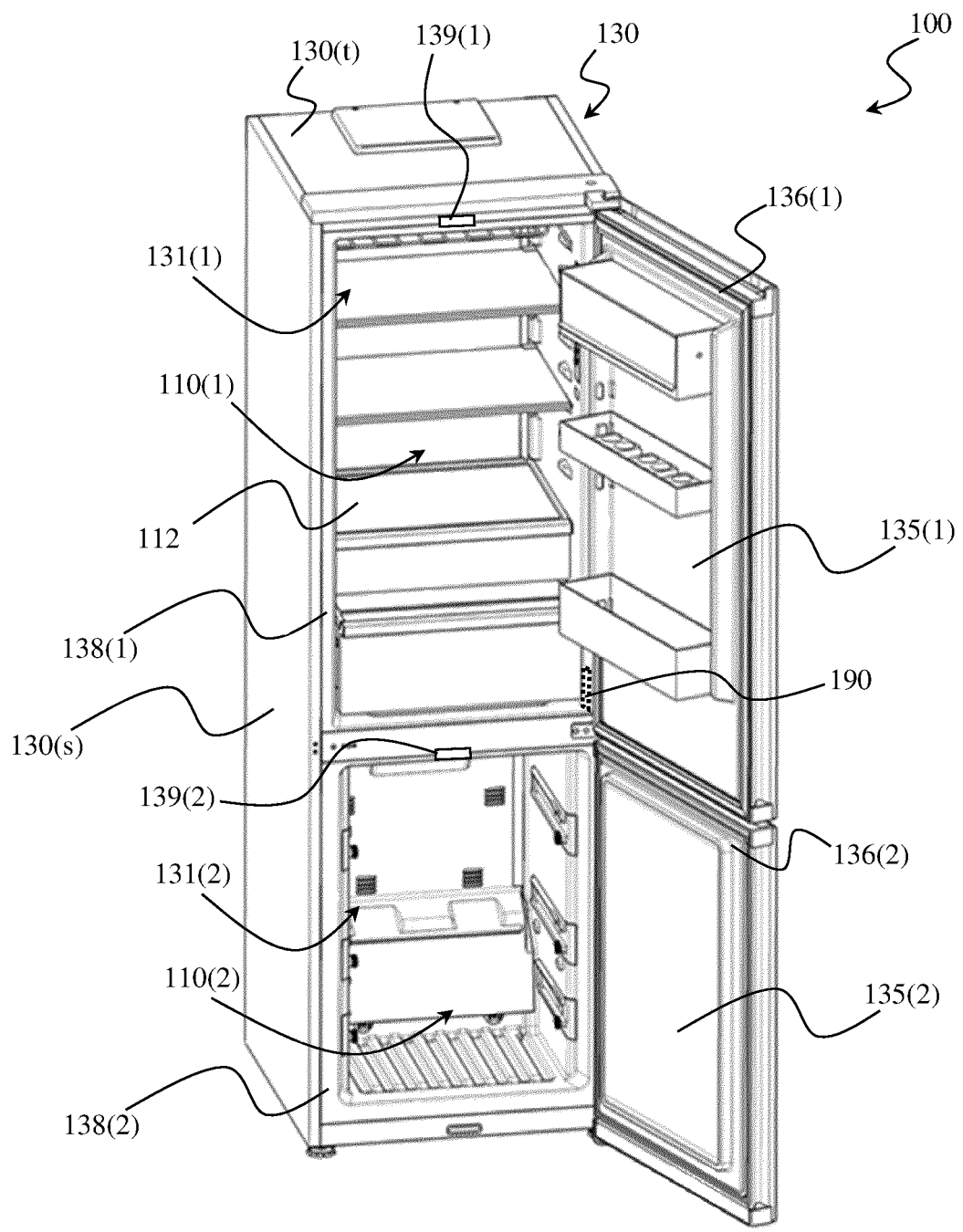

of said pressure signal received when said at least one fan (171) is in the first operative condition.

19 Claims, 2 Drawing Sheets

(56) References Cited

U.S. PATENT DOCUMENTS

| | | | |
|---|---|---|---|
| 9,250,008 B2 * | 2/2016 | Kim | F25D 23/028 |
| 9,605,884 B2 * | 3/2017 | Gomes | F25D 11/022 |
| 10,808,985 B2 * | 10/2020 | Ji | F25D 29/00 |
| 2005/0258260 A1 | 11/2005 | Ahmed | |
| 2008/0072611 A1 * | 3/2008 | Ahmed | F25B 49/02 |
| | | | 62/132 |
| 2014/0150477 A1 | 6/2014 | Qu et al. | |
| 2019/0285331 A1 * | 9/2019 | Kim | F25D 17/06 |

* cited by examiner

REFRIGERATING APPLIANCE WITH A FAN AND WITH A PRESSURE SENSOR

FIELD OF THE INVENTION

The present invention generally relates to a refrigerating appliance. More particularly, the present invention relates to a refrigerating appliance equipped with a pressure sensor system.

BACKGROUND OF THE INVENTION

Among the available sensor devices, pressure sensors are sensor devices configured to measure the pressure of gases or liquids. These sensors can be expediently used in a wide range of different applications, such as for example for measuring the pressure inside of spaces (e.g., a room, a compartment, the environment), measuring altitude, measuring the flow of a fluid, and detecting fluid leaks.

Modern refrigerating appliances having one or more storage compartments for refrigerating food and beverage articles can be equipped with one or more sensor devices, configured to measure the pressure inside said one or more storage compartments, and control the operation of the refrigerating appliance according to the measured pressure. For example, a pressure sensor may be used in order to assess a closed/open condition of a storage compartment door based on the measured pressure inside the refrigerating appliance.

SUMMARY OF INVENTION

It is an object of the present invention to provide a refrigerating appliance equipped with a pressure sensor system that allows to manage and control in an efficient way the operation of the refrigerating appliance itself.

More in detail, it is an object of the present invention to provide a refrigerating appliance having an improved temperature control, optimized power consumptions, and provided with an enhanced fault verify function.

One or more aspects of the present invention are set out in the independent claims, with advantageous features of the same invention that are indicated in the dependent claims.

An aspect of the present invention relates to a refrigerating appliance.

According to an embodiment of the present invention, the refrigerating appliance comprises:
  at least one storage compartment for storing goods to be refrigerated;
  a refrigeration circuit comprising at least one evaporator associated with said at least one storage compartment;
  a control unit configured to control operation of the refrigerating appliance;
  at least one fan, configured to promote heat exchange between said at least one evaporator and the at least one storage compartment, said at least one fan being further configured to be switched between a first operative condition in which said at least one fan is commanded to rotate, and a second operative condition in which said at least one fan is commanded to not rotate.
  a pressure sensor configured to measure the pressure inside said at least one storage compartment and in signal communication with the control unit for providing a pressure signal proportional to the measure of the pressure inside said at least one storage compartment.

According to an embodiment of the present invention, said pressure sensor is a Micro Electro Mechanical System (MEMS) pressure sensor configured to measure the pressure inside said at least one storage compartment and to transmit to the control unit a corresponding pressure signal proportional to said measured pressure.

By MEMS pressure sensor is herein intended a pressure sensor made up of miniaturized electro-mechanical elements (e.g., between 1 and 100 micrometers in size) manufactured using modified semiconductor device fabrication technologies.

Using a MEMS pressure sensor guarantees several advantages, such as, among others, a highly precise output capable of efficiently tracking fast pressure variations, and a limited encumbrance.

According to an embodiment of the present invention, the control unit is configured to control the operation of the refrigerating appliance in function of said pressure signal received when said at least one fan is in the first operative condition.

In this way, the control unit is configured to control the operation of the refrigerating appliance by advantageously taking into consideration the way the activation of the at least one fan influences the pressure inside the storage compartment(s).

According to an embodiment of the present invention, said pressure sensor is an absolute pressure sensor.

In this way, assembling the refrigerating appliance is easy, since (unlike the pressure sensors of the differential type) an absolute pressure sensor does not require to be in fluid communication with two different environments, and there is no constraint about the position in the refrigerating appliance where installing the pressure sensor.

According to an embodiment of the present invention, the at least one fan is in signal communication with the control unit, preferably the control unit being configured to set a rotation speed of the at least one fan in function of said pressure signal.

According to an embodiment of the present invention, the control unit is configured to estimate an air flow rate of said at least one fan in function of said pressure signal.

In this way, it is possible to advantageously set the rotation speed of the at least one fan depending on the actual air flow rate of the fan, which causes the pressure of the air of the space where the fan is located.

According to an embodiment of the present invention, the control unit is configured to control said at least one fan so as to:
  increase the rotation speed of the at least on fan if the pressure signal is below a pressure threshold value;
  decrease the rotation speed of the at least on fan if the pressure signal is above said pressure threshold value.

In this way, the operation of the refrigerating appliance is improved, since the at least one fan is operating at its optimal rotation speed/air flow rate.

Moreover, it is advantageously possible to dynamically regulate the cooling effect of the at least one evaporator based on the actual density of the air, and therefore based on the actual air flow rate of the at least one fan.

According to an embodiment of the present invention, the control unit is configured to increase the rotation speed of the at least one fan if the pressure signal is indicative of a decrease in the pressure inside the at least one storage compartment with respect to said pressure threshold value.

According to an embodiment of the present invention, the control unit is configured to decrease the rotation speed of the at least one fan if the pressure signal is indicative of an increase in the pressure inside the at least one storage compartment with respect to said pressure threshold value.

According to an embodiment of the present invention, the refrigeration circuit further comprises a compressor for causing refrigerant to flow in the refrigeration circuit through the at least one evaporator, the control unit being in signal communication with the compressor and configured to control the refrigerant flow rate of the compressor in function of said pressure signal.

According to an embodiment of the present invention, the control unit is configured to control the refrigerant flow rate of the compressor by adjusting a duty cycle or a speed of the compressor in function of said pressure signal.

According to an embodiment of the present invention, the refrigerating appliance further comprises a temperature sensor configured to measure the temperature inside said at least one storage compartment and provide a corresponding measured temperature value proportional to the measure of the temperature inside said at least one storage compartment, the control unit being further configured to control the refrigerant flow rate of the compressor in function of said pressure signal and in function of the measured temperature value.

In this way, the refrigerant circuit is advantageously controlled and regulated by taking into consideration not only the temperature of the storage compartment(s), but also the sensed actual air flow rate of the fan. This allow to optimize the power consumption by a corresponding improved control of the compressor operation.

According to an embodiment of the present invention, the control unit is configured to control the refrigerant flow rate of the compressor in function of:
said pressure signal, and
a comparison between the measured temperature value and a target value.

According to an embodiment of the present invention, the control unit is configured to increase the refrigerant flow rate of the compressor if both the two following conditions are verified:
the measured temperature value is higher than a target value, and
the estimated air flow rate of the at least one fan is equal to a target air flow rate.

According to an embodiment of the present invention, the target air flow rate is a single value.

According to another embodiment of the present invention, the target air flow rate comprises a range of different values.

According to an embodiment of the present invention, the control unit is configured to decrease the refrigerant flow rate of the compressor and increase the rotation speed of the at least one fan if both the two following conditions are verified:
the estimated air flow rate of the at least one fan is lower than a target air flow rate, and
the measured temperature value is equal to a target value.

According to an embodiment of the present invention, the control unit is configured to decrease the refrigerant flow rate of the compressor if both the two following conditions are verified:
the measured temperature value is lower than a target value, and
the estimated air flow rate of the at least one fan is equal to a target flow rate.

According to an embodiment of the present invention, the refrigerating appliance further comprises at least one defrost heater, the control unit being in signal communication with the defrost heater and configured to control the defrost heater in function of said pressure signal.

According to an embodiment of the present invention, the control unit is configured to activate the at least one defrost heater for a corresponding period of time, the control unit being configured to:
increase the duration of said corresponding period of time if the pressure signal is indicative of a decrease in the pressure inside said at least one storage compartment;
decrease the duration of said corresponding period of time if the pressure signal is indicative of an increase in the pressure inside said at least one storage compartment.

According to an embodiment of the present invention, the control unit is configured to assess fail conditions of the at least one fan in function of said pressure signal received when said at least one fan is in the first operative condition.

In this way, thanks to the precision and the efficient tracking of fast pressure variation of the MEMS pressure sensor, fault conditions of the fan can be detected in a reliable way.

According to an embodiment of the present invention, said at least one fan is configured to be switched between the first operative condition and the second operative condition by the control unit or by a test unit external to the refrigerating appliance.

According to an embodiment of the present invention, said at least one storage compartment comprises a fresh food compartment and a freezer compartment, said pressure sensor being located inside the fresh food compartment or said freezer compartment.

According to an embodiment of the present invention, the refrigerating appliance further comprises:
a cabinet enclosing said at least one storage compartment;
at least one door configured to provide access to said at least one storage compartment when the at least one door is in an open condition and to prevent access to said at least one storage compartment when the at least one door is in a closed condition;
a gasket element mounted along an inner peripheral portion of the at least one door and configured to adhere to a corresponding portion of the cabinet when the at least one door is in the closed condition so as to prevent air in the at least one storage compartment from leaking out of the at least one storage compartment.

According to an embodiment of the present invention, the control unit is configured to assess gasket element faults causing air leakages in function of said pressure signal received when said at least one fan is in the first operative condition.

In this way, thanks to the precision and the efficient tracking of fast pressure variation of the MEMS pressure sensor, fault conditions of the gasket element can be detected in a reliable way.

According to an embodiment of the present invention, the control unit is configured to assess said gasket element faults if the pressure signal decreases toward a value corresponding to an external ambient pressure.

Another aspect of the present invention relates to a method for operating a refrigerating appliance, the refrigerating appliance comprising:
a control unit configured to control operation of the refrigerating appliance
at least one storage compartment for storing goods to be refrigerated;
a refrigeration circuit comprising at least one evaporator associated with said at least one storage compartment;
at least one fan, configured to promote heat exchange between said at least one evaporator and the at least one storage compartment, said at least one fan being further configured to switch between a first operative condition in which said at least one fan is commanded to rotate, and a second operative condition in which said at least one fan is commanded to not rotate;

a MEMS pressure sensor configured to measure the pressure inside said at least one storage compartment for providing a pressure signal proportional to a measure of the pressure inside said at least one storage compartment, the method comprising:

having the at least one fan in said first operative condition;

having the MEMS pressure sensor provide said pressure signal to the control unit;

having the control unit control the operation of the refrigerating appliance in function of the pressure signal received from the MEMS pressure when the fan is in the first operative condition.

BRIEF DESCRIPTION OF THE ANNEXED DRAWINGS

Figure 2:
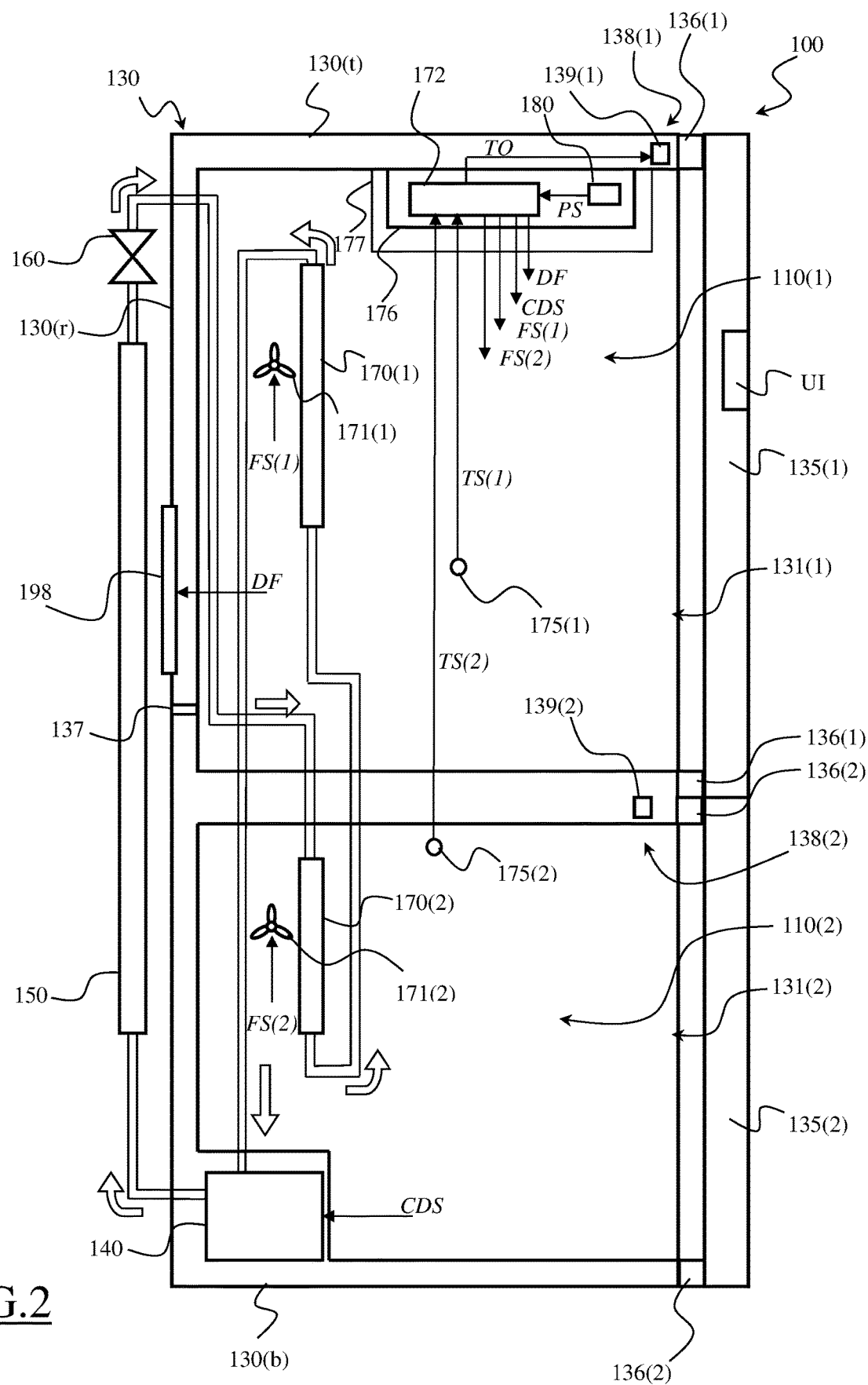

These and other features and advantages of the present invention will be made apparent by the following description of some exemplary and non-limitative embodiments thereof; for its better intelligibility, the following description should be read by making reference to the attached drawings, wherein:

FIG. 1 illustrates a refrigerating appliance;

FIG. 2 schematically illustrates a simplified (not-in-scale) cross-sectional side view of the refrigerating appliance of FIG. 1 according to an embodiment of the present invention;

DETAILED DESCRIPTION OF PREFERRED EMBODIMENTS OF THE INVENTION

FIG. 1 illustrates a refrigerating appliance 100 in which concepts according to embodiments of the present invention can be applied.

The refrigerating appliance 100 comprises a number of well known electronic, mechanical and/or electro-mechanical components—however, for the sake of description ease and conciseness, only those being relevant for understanding the invention will be introduced and discussed in the following.

According to an embodiment of the present invention, the refrigerating appliance 100 is a combined-type refrigerating appliance, comprising a first storage compartment 110(1) and a second storage compartment 110(2) where food and beverage articles can be stored and preserved by refrigeration at different temperatures.

In the considered example, the first storage compartment 110(1) is a storage compartment adapted to operate at higher temperature than the second storage compartment 110(2).

For example, the first storage compartment 110(1) is a higher-temperature storage compartment, such as a fresh-food compartment, adapted to be at temperatures above 0° C. (e.g., in the range [3, 7] ° C.), and the second storage compartment 110(2) is a lower-temperature storage compartment, such as a freezer compartment, adapted to be at temperatures below 0° C. (e.g., in the range [−27, −18] ° C.). These temperature ranges have to be intended only as non limitative examples, since the concepts of the present invention can be directly applied to any range of temperatures, and also if the first and second storage compartments 110(1), 110(2) are both adapted to operate at temperatures below 0° C. or are both adapted to operate at temperatures above 0° C.

In the illustrated example, the first storage compartment 110(1) is positioned above the second storage compartment 110(2), however similar considerations apply in case the positions of the two compartments 110(1), 110(2) are swapped, or in case a single storage compartment only is provided.

Shelves 112 and other structures for supporting and storing food and beverage articles may be provided within both the first and second storage compartments 110(1), 110(2) (in the example illustrated in FIG. 1, only visible in the first storage compartment 110(1)).

According to an embodiment of the present invention, the refrigerating appliance 100 comprises a substantially parallelepiped-shaped cabinet 130 having a top panel 130(t), a rear panel (not visible in FIG. 1), a bottom panel (not visible in FIG. 1), side panels 130(s) (only one visible in FIG. 1). Naturally, similar considerations apply in case the cabinet 130 has a different shape and/or structure.

In order to access the first and second storage compartments 110(1), 110(2), a front section of the cabinet 130 (i.e., the side thereof substantially perpendicular to the top panel 130(t), the bottom panel, and the side panels 130(s)) is provided with respective openings 131(1), 131(2). A first door 135(1) and a second door 135(2) are hingedly mounted to the front section of the cabinet 130 to selectively close/open the openings 131(1) and 131(2), respectively, in order to provide selective access to the first storage compartment 110(1) and to the second storage compartment 110(2), respectively. Different configurations can be also contemplated, such as for example in which a single door is provided for selectively closing/opening the openings 131(1) and 131(2), or in which the refrigerating appliance 100 has a single storage compartment only and a single door.

In FIG. 1, both the first door 135(1) and a second door 135(2) are depicted in an open condition.

According to a preferred embodiment of the present invention, the first door 135(1) comprises a gasket element 136(1) mounted along an inner peripheral portion of the first door 135(1), and configured to adhere with and remain flush with a corresponding border portion 138(1) of the front section of the cabinet 130 surrounding the opening 131(1) when the first door 135(1) is in the closed condition. In this way, air in the first storage compartment 110(1) is prevented from leaking out of the first storage compartment 110(1) through the opening 131(1) when the first door 135(1) is in the closed condition.

Similarly, according to a preferred embodiment of the present invention, the second door 135(2) comprises a gasket element 136(2) mounted along an inner peripheral portion of the second door 135(2), and configured to adhere with and remain flush with a corresponding border portion 138(2) of the front section of the cabinet 130 surrounding the opening 131(2) when the second door 135(2) is in the closed condition. In this way, air in the second storage compartment 110(2) is prevented from leaking out of the second storage compartment 110(2) through the opening 131(2) when the second door 135(2) is in the closed condition.

Without entering in details well known to those skilled in the art, the gasket elements 136(1) 136(2) are made of a deformable material, such as Polyvinyl chloride (PVC) or neoprene. Preferably, the gasket element 136(1) encloses magnetic material elements, e.g., magnetic strips, which are configured to be attracted toward the border portion 138(1), preferably by magnetic coupling elements 139(1) located at the border portion 138(1). Similarly, the gasket element 136(2) encloses magnetic material elements, e.g., magnetic strips, which are configured to be attracted toward the border portion 138(2), preferably by magnetic coupling elements 139(2) located at the border portion 138(2).

FIG. 2 schematically illustrates a simplified (not-in-scale) cross-sectional side view of the refrigerating appliance 100 taken from a section plane parallel to the side panels 130(s) according to an embodiment of the present invention.

In FIG. 2, the rear panel of the cabinet 130 is identified with reference 130(r), and the bottom panel of the cabinet 130 is preferably identified with reference 130(b).

In FIG. 2, both the first door 135(1) and a second door 135(2) are depicted in a closed condition, with the gasket element 136(1) that is flush with the border portion 138(1) and the gasket element 136(2) that is preferably flush with the border portion 138(2).

According to a preferred embodiment of the present invention, one or more vent holes 137 are provided (only one illustrated in FIG. 2), each one arranged to form a small and narrow passage through which (small amount of) air can pass between the external environment (i.e., external with respect to the refrigerating appliance 100) and the storage compartments 110(1), 110(2). The vent holes 137 are expediently used to (relatively slowly) bring back the pressure inside the storage compartments 110(1), 110(2) to the external ambient air pressure following pressure variations inside the storage compartments 110(1), 110(2) caused by perturbations (e.g., the opening/closing of one of the doors 135(1), 135(2)).

According to a preferred embodiment of the present invention, the refrigerating appliance 100 is equipped with a refrigeration circuit for circulating a refrigeration fluid (briefly referred to as "refrigerant").

According to an embodiment of the present invention, the refrigeration circuit comprises a compressor unit 140, a condenser unit 150, a fluid expansion unit 160, a first evaporator unit 170(1) associated to the first storage compartment 110(1), and a second evaporator unit 170(2) associated to the second storage compartment 110(2).

According to an embodiment of the present invention, the two evaporator units 170(1) and 170(2) are fluidly connected in series to each other in the refrigeration circuit, with the second evaporator unit 170(2) that is upstream the first evaporator unit 170(2) along the flow direction of the refrigerant in said refrigeration circuit (illustrated in the figures through bold arrows). It is pointed out that the concepts of the present invention can be directly applied to refrigerating appliances having a different kind of refrigeration circuit, such as for example a refrigerating appliance in which each storage compartment has a respective and independent refrigeration circuit or a refrigeration circuit having one evaporator only fluidically communicating with both compartments.

As it is well known to those skilled in the art, the compressor unit 140 carries out the double function of compressing the refrigerant and causing the circulation of refrigerant itself in the refrigeration circuit—so that the refrigerant flows, in sequence, through the condenser unit 150, the fluid expansion unit 160, the second evaporator unit 170(2), and the first evaporator unit 170(1), before reaching again the compressor unit 140.

According to a preferred embodiment of the present invention, the compressor unit 140 is located on a bottom portion of the refrigerating appliance 100, preferably close to the rear panel 130(r) of the cabinet 130.

According to a preferred embodiment of the present invention, the condenser unit 150 is provided on the rear portion of the refrigerating appliance 100, such as at the rear panel 130(r) of the cabinet 130.

According to an embodiment of the present invention, the first evaporator unit 170(1) is located at the first storage compartment 110(1), for example close to the rear panel 130(r), and the second evaporator unit 170(2) is located at the second storage compartment 110(2), for example close to the rear panel 130(r).

Naturally, the concepts of the present invention can be directly applied in case one or more among the compressor unit 140, the condenser unit 150, the fluid expansion unit 160, the first evaporator unit 170(1), and the second evaporator unit 170(2) are located in different positions of the refrigerating appliance 100, provided that the first evaporator unit 170(1) is arranged in such a way to be able of generating refrigerating air in the first storage compartment 110(1) and the second evaporator unit 170(2) is arranged in such a way to be able of generating refrigerating air in the second storage compartment 110(2).

The compressor unit 140 has an input port fluidly coupled with an output port of the first evaporator unit 170(1) for receiving refrigerant—in the vapor phase—at a relatively low temperature and at a relatively low pressure.

The compressor unit 140 has an output port fluidly coupled with an input port of the condenser unit 150.

The compressor unit 140 is configured to compress the refrigerant received by the first evaporator unit 170(1) so as to increase the pressure and temperature thereof, and to provide the compressed refrigerant to the condenser unit 150.

The compressed refrigerant, still in the vapor phase, flows through the condenser unit 150, wherein it condenses to liquid phase by heat exchange with ambient air.

The condenser unit 150 has an output port fluidly coupled with the fluid expansion unit 160 for providing the refrigerant, now in form of a high pressure liquid, to the latter unit.

The fluid expansion unit 160, for example an expansion valve or a capillary tube, is configured to reduce the pressure, and the temperature, of the refrigerant.

The refrigerant outputted by the fluid expansion unit 160—which is a low pressure, low temperature fluid in which liquid and vapor phase coexist—is fed to an input port of the second evaporator unit 170(2).

As the refrigerant flows through the second evaporator unit 170(2), part of the liquid fraction of the refrigerant turns from liquid into vapor through evaporation, causing air inside the second storage compartment 110(2) to cool down.

The refrigerant exits the second evaporator unit 170(2) through an output port thereof, that is fluidly coupled with an input port of the first evaporator unit 170(1).

As the refrigerant flows through the first evaporator unit 170(1), the remaining liquid fraction of the refrigerant turns from liquid into vapor through evaporation, causing air inside the first storage compartment 110(1) to cool down. Once the liquid fraction of the refrigerant is entirely turned into vapor, the temperature of the refrigerant starts to rise up.

According to an embodiment of the present invention, the second evaporator unit 170(1) is smaller than the second evaporator unit 170(2), so that the temperature in the first storage compartment 110(1) is higher than the temperature in the second storage compartment 110(2).

The refrigerant—now in vapor phase—outputted from the output port of the second evaporator unit 170(2) is then fed again to the compressor unit 140.

According to an embodiment of the present invention, each of or one between the first evaporator unit 170(1) and the second evaporator unit 170(2) may be associated with a respective fan 171(1), 171(2) configured to promote heat exchange between the evaporator itself and the storage compartment associated to the evaporator.

According to an embodiment of the present invention, the compressor unit 140 is capable of setting the volume of refrigerant delivered per time unit (also referred to as "refrigerant flow rate" or "refrigerant throughput"), and therefore setting the temperature inside the storage compartments 110(1) and 110(2) under the control of a control unit 172 configured to control the operation of the refrigerating appliance 100. For example, the control unit 172 may be configured to generate and send to the compressor unit 140 a compressor driving signal CDS indicative of a desired refrigerant flow rate.

As it is well known to those skilled in the art:
if the flow rate of the compressor unit 140 is increased, the cooling effect of the first and second evaporator units 170(1), 170(2) is increased, causing a reduction of the temperatures of the corresponding storage compartments 110(1), 110(2) if other operative parameters are held constant;
if the flow rate of the compressor unit 140 is decreased, the cooling effect of the first and second evaporator units 170(1), 170(2) is reduced, causing an increasing of the temperatures of the corresponding storage compartments 110(1), 110(2) if other operative parameters are held constant.

According to an embodiment of the present invention, the control unit 172 is configured to set the flow rate of the compressor unit 140 by setting the speed thereof, for example to a value proportional to the compressor driving signal CDS.

According to an embodiment of the present invention, the control unit 172 is configured to set the flow rate of the compressor unit 140 by setting the duty cycle thereof, for example to a value proportional to the compressor driving signal CDS.

As it is well known to those skilled in the art, the higher the speed or the duty cycle of the compressor unit 140, the higher the flow rate. Conversely, the lower the speed or the duty cycle of the compressor unit 140, the lower the flow rate.

According to an embodiment of the present invention, the refrigerating appliance 100 comprises a user interface UI through which a user may input commands to the control unit 172. For example, the user interface UI can be advantageously exploited for setting a desired temperature for the first storage compartment 110(1), hereinafter referred to as first target temperature Tt(1), and a desired temperature for the second storage compartment 110(2), hereinafter referred to as second target temperature Tt(2).

Different kind of user interfaces UI can be provided, from simple rotary knobs inside the storage compartments, to more advanced user interfaces provided with touch screen, buttons, and/or visual display located on one or more of the doors and/or on cabinet. Still more advanced user interfaces UI can be considered, comprising a wireless communication unit adapted to receive commands and provide data from/to a personal user device, such as a smartphone.

According to an embodiment of the present invention, temperature sensors are provided in both the first storage compartment 110(1) and the second storage compartment 110(2) for sensing the temperature thereinside.

Particularly, according to a preferred embodiment of the present invention, a first temperature sensor 175(1) is located inside the first storage compartment 110(1) and a second temperature sensor 175(2) is located inside the second storage compartment 110(2).

According to a preferred embodiment of the present invention, the first and second temperature sensors 175(1), 175(2) are connected to the control unit 172, to provide the sensed temperatures to the latter. The first temperature sensor 175(1) is configured to provide a first sensed temperature Ts(1) value indicative of the temperature inside the first storage compartment 110(1) to the control unit 172, and the second temperature sensor 175(2) is configured to provide a second sensed temperature Ts(2) value indicative of the temperature inside the second storage compartment 110(2) to the control unit 172.

According to an embodiment of the present invention, the control unit 172 is configured to set the flow rate of the compressor unit 140 in function of the first sensed temperature Ts(1), to the second sensed temperature Ts(2), to the first target temperature Tt(1), and to the second target temperature Tt(2). For example, the control unit 172 may be configured to set the flow rate of the compressor unit 140 in function of a first difference D(1)=Ts(1)−Tt(1) between the first sensed temperature Ts(1) and the first target temperature Tt(1), and in function of a second difference D(2)=Ts(2)−Tt(2) between the second sensed temperature Ts(2) and the second target temperature Tt(2). For example, the control unit 172 may be configured to set the flow rate of the compressor unit 140 in function of a value corresponding to an average of the first and second differences D(1), D(2).

According to an embodiment of the present invention, each of the first fan 171(1) and the second fan 17(2) is configured to be switched between a first operative condition (hereinafter, "active operative condition") in which the fan is commanded to rotate, and a second operative condition (hereinafter, "inactive operative condition") in which the fan is commanded to not rotate.

For example, according to an embodiment of the present invention, the control unit 172 is configured to switch the first fan 171(1) to the active operative condition by generating and sending to the first fan 171(1) a corresponding first fan driving signal FS(1). Similarly, according to an embodiment of the present invention, the control unit 172 is configured to switch the second fan 171(2) to the active operative condition by generating and sending to the second fan 171(2) a corresponding second fan driving signal FS(2).

According to a preferred embodiment of the present invention, the control unit 172 is configured to set the rotation speed of the first fan 171(1) and of the second fan 171(2).

For example, the control unit 172 may be configured to set the rotation speed of the first fan 171(1) to a value depending on (e.g., proportional to) the first fan driving signal FS(1). Similarly, the control unit 172 may be configured to set the rotation speed of the second fan 171(2) to a value depending on (e.g., proportional to) the second fan driving signal FS(2).

As it is known to those skilled in the art, if other operative parameters are held constant, the volume of air moved per time unit (also referred to as "air flow rate") of a fan depends on (i.e., it is proportional to) the rotation speed of the fan itself. Therefore, by setting the rotation speed of the first fan 171(1) it is possible to set also the air flow rate of the first fan 171(1), and by setting the rotation speed of the second fan 171(2) it is possible to set also the air flow rate of the second fan 171(2).

If the flow rate of the first fan 171(1) is increased, the thermal exchange between the first evaporator 170(1) and the volume of air inside the first storage compartment 110(1) is improved, and therefore, if other operative parameters are held constant, the temperature inside the first storage compartment 110(1) is decreased.

If the flow rate of the first fan 171(1) is decreased, the heat exchange between the first evaporator 170(1) and the volume of air inside the first storage compartment 110(1) is reduced, and therefore, if other operative parameters are held constant, the temperature inside the first storage compartment 110(1) is increased.

If the flow rate of the second fan 171(2) is increased, the heat exchange between the second evaporator 170(2) and the volume of air inside the second storage compartment 110(2) is improved, and therefore, if other operative parameters are held constant, the temperature inside the second storage compartment 110(2) is decreased.

If the flow rate of the second fan 171(2) is decreased, the heat exchange between the second evaporator 170(2) and the volume of air inside the second storage compartment 110(2) is reduced, and therefore, if other operative parameters are held constant, the temperature inside the second storage compartment 110(2) is increased.

According to a preferred embodiment of the present invention, the control unit 172 is configured to set the rotation speed (and therefore the air flow rate) of the first fan 171(1) in function of the first difference D(1), i.e., in function of the difference between the first sensed temperature Ts(1) and the first target temperature Tt(1).

According to a preferred embodiment of the present invention, the control unit 172 is configured to set the rotation speed (and therefore the air flow rate) of the second fan 171(2) in function of the second difference D(2), i.e., in function of the difference between the second sensed temperature Ts(2) and the second target temperature Tt(2).

According to an embodiment of the present invention, the refrigerating appliance 100 comprises a pressure sensor 180 located inside one of the storage compartments 110(1), 110(2). In the embodiment of the invention illustrated in FIG. 2, the pressure sensor 180 is located in the first storage compartment 110(2), however, similar considerations apply if the pressure sensor 180 is located in the second storage compartment. Solutions are contemplated in which more than one pressure sensors 180 are provided, for example each one located in a respective storage compartment.

According to an embodiment of the present invention, the pressure sensor 180 is in signal communication with the control unit 172.

According to an embodiment of the present invention, the pressure sensor 180 is configured to output a corresponding pressure signal PS proportional to the measured pressure to the control unit 172.

According to an embodiment of the present invention, said pressure signal PS is a digital signal.

According to a preferred embodiment of the present invention, the pressure sensor 180 is a Micro Electro Mechanical System (MEMS) pressure sensor configured to measure the pressure inside the storage compartment 110(1), 110(2) wherein it is located.

According to an embodiment of the present invention, the pressure sensor 180 is a MEMS capacitive pressure sensor, comprising a first conductive layer deposed on a flexible diaphragm suspended over a cavity, and a second conductive layer deposed on the bottom of the cavity. In this way, a capacitor is formed, the electric capacitance thereof changing in response to deflections of the diaphragm caused by the pressure.

According to another embodiment of the present invention, the pressure sensor 180 is a MEMS piezoresistive pressure sensor, comprising piezoresistive conductive layers deposed on a suspended flexible diaphragm. The electric resistance of the piezoresistive conductive layers change in response to deflections of the diaphragm caused by the pressure.

According to an embodiment of the present invention, the (MEMS) pressure sensor 180 is an absolute pressure sensor, i.e., a pressure sensor having a single port, which is in fluid communication with the environment the pressure thereof is intended to be measured. In the exemplary embodiment of the invention illustrated in FIG. 2, this environment in fluid communication with said single port of the pressure sensor 180 is the first storage compartment 110(i).

Thanks to the intrinsic simplicity (from the interconnection point of view) of the pressure sensor 180 according to the embodiment of the present invention, the feasible locations for installing the pressure sensor 180 in the refrigerating appliance 100 are many, because an absolute pressure sensor does not require the provision of tube elements.

For example, according to an advantageous embodiment of the present invention, the pressure sensor 180 is advantageously mounted on the circuit board 176 where the control unit 172 is located. In this way, no complicated wiring is required for sending the pressure signal PS generated by the pressure sensor 180 to the control unit 172, since both the former and the latter are located on a same circuit board. Moreover, the pressure sensor 180 may by advantageously powered exploiting the same power supply used by the other components located on the circuit board 176, like the same power supply used for supplying the control unit 172.

Naturally, similar considerations apply in case the pressure sensor 180 is located in a different portion of the storage compartment 110(1) (or 110(2)). For example, the pressure sensor 180 can be installed in the same circuit board wherein Light-Emitting Diodes (LEDs) (not illustrated in the figures) for the illumination of the storage compartment 110(1) (or 110(2)) are provided.

According to an embodiment of the present invention, the control unit 172 is configured to control the operation of the refrigerating appliance 100 based on the pressure signal PS generated by the pressure sensor 180 when at least one between the first and second fan 171(1), 171(2) are in the active operative condition, i.e., when at least one between the first and second fan 171(1), 171(2) is commanded to rotate.

In other words, according to an embodiment of the present invention, the control unit 172 is configured to control the operation of the refrigerating appliance 100 by advantageously taking into consideration the way the activation of the first and second fan 171(1), 171(2) influence the pressure inside the storage compartment 110(1) and/or 1102(2).

According to an embodiment of the present invention, the information about the pressure inside the storage compartment 110(1) and/or 1102(2) is advantageously exploited by the control unit 172 to properly set the rotation speed of the first fan 171(1) and/or the second fan 171(2). More in particular, since the air flow rate of a fan depends on the pressure of the air of the space wherein the fan is located, by knowing the pressure inside the storage compartment 110(1) and/or the storage compartment 110(2) when the first fan 110(1) and/or second fan 110(2) is/are commanded to rotate it is possible to estimate the air flow rate of the first fan 110(1) and/or second fan 110(2).

Indeed, given a rotation speed value of a fan, the higher the pressure of the storage compartment where the fan is located, the higher the air flow rate of said fan because of a higher air density. Similarly, given a rotation speed value of a fan, the lower the pressure of the storage compartment where the fan is located, the lower the air flow rate of said fan because of a lower air density.

In view of the above, and by making reference to the exemplary embodiment of the present invention illustrated in FIG. 2 in which the pressure sensor 180 is located in the first storage compartment 110(1), according to an embodiment of the present invention the control unit 172 is configured to set the rotation speed of the first fan 171(1) in function of the pressure signal PS generated by the pressure sensor 180.

According to an embodiment of the present invention, the control unit 172 is configured to estimate the air flow rate of the first fan 171(1) according to the pressure signal PS.

According to an embodiment of the present invention, the control unit 172 is configured to control the first fan 171(1) in such a way to:
increase the rotation speed of the first fan 171(1) if the pressure signal PS has a value lower than a corresponding pressure threshold value PTH;
decrease the rotation speed of the first fan 171(1) if the pressure signal PS has a value higher than the pressure threshold value PTH.

Indeed, a low pressure (lower than the pressure threshold value PTH) may cause a too low air flow rate of the fan, which can be compensated by increasing the rotation speed of the fan.

Similarly, a high pressure (higher than the pressure threshold value PTH) may cause an increase of the air flow rate of the fan that can be advantageously exploited to reduce the rotation speed of the fan for obtaining a desired target air flow rate with a reduced power consumptions.

Naturally, similar considerations apply in case the pressure sensor 180 is located in the second storage compartment 110(2). In this case, according to an embodiment of the invention, the control unit 172 is configured to estimate the air flow rate of the second fan 171(2) in function of the pressure signal PS, and/or according to an embodiment of the present invention, the control unit 172 is configured to control the second fan 171(2) in such a way to:
increase the rotation speed of the second fan 171(2) (e.g., by increasing the value of the first fan driving signal FS(1)) if the pressure signal PS has a value lower than a corresponding pressure threshold value PTH;
decrease the rotation speed of the second fan 171(2) (e.g., by decreasing the value of the first fan driving signal FS(1)) if the pressure signal PS has a value higher than the pressure threshold value PTH.

According to an embodiment of the present invention, the control unit 172 is configured to increase the rotation speed of the first fan 171(1) (or, in case the pressure sensor 180 is in the second storage compartment 110(2), of the second fan 171(2)) if the pressure signal PS is indicative of a decrease in the pressure inside the first storage compartment 110(1) with respect to the pressure threshold value PTH.

According to an embodiment of the present invention, the control unit 172 is configured to decrease the rotation speed of the first fan 171(1) (or, in case the pressure sensor 180 is in the second storage compartment 110(2), of the second fan 171(2)) if the pressure signal PS is indicative of an increase in the pressure inside the first storage compartment 110(1) with respect to the pressure threshold value PTH.

According to an embodiment of the present invention, the control unit 172 is configured to control the refrigerant flow rate of the compressor unit 140 in function of the pressure signal PS generated by the pressure sensor 180, in such a way to dynamically regulate the cooling effect of the first and second evaporator units 170(1), 170(2) based on the actual density of the air, and therefore based on the actual air flow rate of the first and/or second fan 171(1), 171(2).

By making reference to the exemplary embodiment of the invention illustrated in FIG. 2, in which the pressure sensor 180 is located in the storage compartment 110(1), since the higher the pressure signal PS, the higher the air flow rate of the first fan 171(1) (if other operative parameters are held constant), according to an embodiment of the present invention the control unit 172 may advantageously decrease the cooling effect of the first and second evaporator units 170(1), 170(2) by decreasing the refrigerant flow rate (e.g., by setting the speed or the duty cycle of the compressor unit 140 through the compressor driving signal CDS) in case the pressure signal PS has a high value. Indeed, in this particular situation, the refrigerant flow rate of the compressor unit 140 may be advantageously reduced, reducing thus electric power consumption, without impairing the overall efficacy of the refrigerating appliance 100, since the reduced cooling effect of the first evaporator unit 170(1) is compensated by an increased heat exchange between the first evaporator unit 170(1) and the storage compartment 110(1) promoted by the first fan 171(1) in a high air pressure condition.

Similarly, since the lower the pressure signal PS, the lower the air flow rate of the first fan 171(1) (if other operative parameters are held constant), according to an embodiment of the present invention the control unit 172 may advantageously increase the cooling effect of the first and second evaporator units 170(1), 170(2) by increasing the refrigerant flow rate of the compressor unit 140 (e.g., by setting the speed or the duty cycle thereof through the compressor driving signal CDS) in case the pressure signal PS has a low value. Indeed, in this particular situation, the refrigerant flow rate of the compressor unit 140 may be advantageously increased to increase the cooling effect of the first evaporator unit 170(1) to compensate for the reduced heat exchange between the first evaporator unit 170(1) and the storage compartment 110(1) promoted by the first fan 171(1) in a low air pressure condition.

Similar considerations apply in case the pressure sensor 180 is located in the second storage compartment 110(2).

According to an embodiment of the present invention, the control unit 172 is configured to control the refrigerant flow rate of the compressor unit 140 (e.g., by setting the speed or the duty cycle thereof through the compressor driving signal CDS) in function of the pressure signal PS generated by the pressure sensor 180 and the temperature sensed by the temperature sensor located in the storage compartment wherein the pressure sensor 180 is located.

By making reference to the exemplary embodiment of the invention illustrated in FIG. 2, wherein the pressure sensor 180 is located in the storage compartment 110(1), the control unit 172 is configured to control the refrigerant flow rate of the compressor unit 140 in function of the pressure signal PS generated by the pressure sensor 180 and in function of the first sensed temperature Ts(1) measured by the first temperature sensor 175(1).

According to an embodiment of the present invention, the control unit 172 is configured to control the refrigerant flow rate of the compressor unit 140 in function of the pressure signal PS and a comparison between the first sensed temperature Ts(1) and the first target temperature Tt(1).

More in detail, according to an embodiment of the present invention, the control unit 172 is configured to estimate the air flow rate of the first fan 171(1) in function of the pressure signal PS, and increase the refrigerant flow rate of the compressor unit 140 if both the two following conditions are verified:

the first sensed temperature Ts(1) is higher than the first target temperature Tt(1), and the estimated air flow rate of the first fan 171(1) is equal to or higher than a target air flow rate TFR(1).

In this situation, the control unit 172 is aware that the temperature in the first storage compartment 110(1) is too high, while the actual air flow rate of the first fan 171(1) is already at the desired target air flow rate TFR(1). Therefore, the best way for reducing the temperature in the first storage compartment 110(1) without causing an undesired variation of the actual air flow rate of the first fan 171(1) is to increase the cooling effect of the first evaporator unit 170(1) by increasing the refrigerant flow rate of the compressor unit 140.

According to an embodiment of the present invention, the target air flow rate TFR(1) is a single value.

According to another embodiment of the present invention, the target air flow rate TFR(1) may comprises a range of different values.

According to an embodiment of the present invention, the control unit 172 is configured to estimate the air flow rate of the first fan 171(1) in function of the pressure signal PS, and decrease the refrigerant flow rate of the compressor unit 140 if both the two following conditions are verified:

the first sensed temperature Ts(1) is lower than the first target temperature Tt(1), and the estimated air flow rate of the first fan 171(1) is equal to or higher than the target air flow rate TFR(1).

In this situation, the control unit 172 is aware that the temperature in the first storage compartment 110(1) is too low, while the actual air flow rate of the first fan 171(1) is already at the desired target air flow rate TFR(1). Therefore, the best way for increasing the temperature in the first storage compartment 110(1) without causing an undesired variation of the actual air flow rate of the first fan 171(1) is to decrease the cooling effect of the first evaporator unit 170(1) by decreasing the refrigerant flow rate of the compressor unit 140.

According to an embodiment of the present invention, the control unit 172 is configured to estimate the air flow rate of the first fan 171(1) in function of the pressure signal PS, and decrease the refrigerant flow rate of the compressor unit 140 and at the same time increase the rotation speed of the first fan 171(1) if both the two following conditions are verified:

the estimated air flow rate of the first fan 171(1) is lower than the target air flow rate TFR(1), and the first sensed temperature Ts(1) is equal to the first target temperature Tt(1).

In this situation, the control unit 172 is aware that while the temperature in the first storage compartment 110(1) is at the desired value TT(1), the actual air flow rate of the first fan 171(1) is lower than the desired target air flow rate TFR(1). Therefore, the rotation speed of the first fan 171(1) is increased to bring the air flow rate of the first fan 171(1) to the target air flow rate TFR(1), and the potential and undesired temperature decrease caused by such increased rotation speed of the first fan 171(1) is counterbalanced by a reduced refrigerant flow rate of the compressor unit 140.

Naturally, similar considerations apply in case the pressure sensor 180 is located in the second storage compartment 110(2), with the control unit 172 that is configured to take into account the second sensed temperature Ts(2), the second target temperature Tt(2), and a target air flow rate TFR(2) of the second fan 171(2).

According to an embodiment of the present invention, the pressure inside the storage compartment 110(1) and/or 110(2) measured by the pressure sensor 180 may be also exploited to assess condensation/dew point conditions of the refrigerating appliance 100 during the operation thereof.

According to an embodiment of the present invention, the refrigerating appliance 100 further comprises one or more defrost heaters (only one depicted in FIG. 2, and identified with reference 198) adapted to be driven by the control unit 172 to be (e.g., periodically) activated for melting frost formed on internal walls of the storage compartments because of dew. According to an embodiment of the present invention, the control unit 172 is configured to drive the defrost heater 198 by transmitting a defrost activation command DF to the latter for the activation thereof.

According to an embodiment of the present invention, the control unit 172 is configured to activate the defrost heater 198 (through the defrost activation command DF) and keep activated said defrost heater 198 for a corresponding time period (defrost period DP).

According to an embodiment of the present invention, the control unit 172 is configured to control the defrost heater 195 in function of the pressure signal PS generated by the pressure sensor 180.

According to an embodiment of the present invention, the control unit 172 is configured to increase the defrost period DP during which the defrost heater 198 is kept activated if the pressure signal PS is indicative of a decrease of pressure inside the first storage compartment 110(1). Indeed, in this condition, the dew point temperature is decreased, and a longer defrost period DP is required.

Similarly, the control unit 172 is configured to decrease the defrost period DP during which the defrost heater 198 is kept activated if the pressure signal PS is indicative of an increase of pressure inside the first storage compartment 110(1). Indeed, in this condition, the dew point temperature is increased, and a shorter defrost period DP is required.

According to an embodiments of the present invention, the precise and reliable pressure measure that can be obtained thanks to the pressure sensor 180 is advantageously exploited to assess fail conditions of the fan 171(1) and/or 171(2).

By making reference to the exemplary embodiment of the invention illustrated in FIG. 2, wherein the pressure sensor 180 is located in the storage compartment 110(1), the control unit 172 is configured to assess a fail condition of the fan 171(1) in function of the pressure signal PS when the fan 171(1) is in the active operative condition, i.e., when it is commanded to rotate.

When the fan 171(1) is in the active operative condition (and therefore it is in a condition in which it is commanded to rotate) and actually rotates, a pressure variation is caused inside the storage compartment 110(1) that is detected by the pressure sensor 180. In this situation, the control unit 172 assesses that the fan 171(1) is operating in a correct way.

When the fan 171(1) is in the active operative condition (and therefore it is in a condition in which it is commanded to rotate) but does not rotate, no pressure variation is caused inside the storage compartment 110(1). In this situation, the control unit 172 assesses that the fan 171(1) is affected by a fault.

This procedure can be carried out by the control unit 172 periodically, so as to implement an automatic diagnostic function.

According to another embodiment of the present invention, when the fan 171(1) is in the active operative condition and it is commanded to rotate to generate an air flow rate corresponding to the target air flow rate TFR(1), but the fan 171(1) is not capable of reaching the target air flow rate TFR(1), this fan condition can be advantageously assessed by the control unit 172 by receiving from the pressure sensor 180 a pressure signal PS indicative of a too low pressure inside the storage compartment 110(1).

Naturally, similar considerations apply to the second fan 171(2) in case the pressure sensor 180 is located in the second storage compartment 110(2).

As already described in the previous, according to an embodiment of the present invention, the switching of the fans 171(1), 171(2) between the active operative condition and the inactive operative condition is carried out by the control unit 172 through the generation and sending of the first fan driving signal FS(1) and of the second fan driving signal FS(2). However, the concepts of the present invention can be applied also in case the switching of the fans 171(1), 171(2) between the active operative condition and the inactive operative condition during test operations is carried out by a proper test unit external to the refrigerating appliance 100.

According to an embodiments of the present invention, the precise and reliable pressure measure that can be obtained thanks to the pressure sensor 180 is advantageously exploited to assess faults in the gasket element(s) 136(1) and/or 136(2) causing air leakages.

By making reference to the exemplary embodiment of the invention illustrated in FIG. 2, wherein the pressure sensor 180 is located in the storage compartment 110(1), the control unit 172 is configured to assess a fault in the gasket element 136(1) causing air leakage in function of the pressure signal PS when the fan 171(1) is in the active operative condition, i.e., when it is commanded to rotate.

According to an embodiment of the present invention, the control unit 172 is configured to assess a fault in the gasket element 136(1) causing air leakage if the pressure signal PS measured by the pressure sensor 180 when the first an 171(1) is in the active operative condition decreases toward a value corresponding to an external ambient temperature. Indeed, the pressure increase caused by the rotation of the first fan 171(1) is compensated by the air leakage caused by the fault in the gasket element 136(1). In other words, if the gasket element 136(1) has a fault causing air leakage, the pressure inside the first storage compartment 110(1) is brought toward the external ambient pressure irrespective of the rotation of the fan 171(1).

Similar considerations apply to the second fan 171(2) in case the pressure sensor 180 is located in the second storage compartment 110(2).

Naturally, in order to satisfy local and specific requirements, a person skilled in the art may apply to the invention described above many logical and/or physical modifications and alterations. More specifically, although the invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof; on the contrary, well known features may have been omitted or simplified in order not to obscure the description with unnecessary particulars.

For example, although in the embodiments of the invention herein described the refrigerating appliance comprises two storage compartments, the concepts of the present invention can be directly applied in case more than two storage compartments are provided.

The invention claimed is:

1. A refrigerating appliance comprising:
    at least one storage compartment for storing goods to be refrigerated;
    a cabinet enclosing said at least one storage compartment;
    at least one door configured to provide access to said at least one storage compartment when the at least one door is in an open condition and to prevent access to said at least one storage compartment when the at least one door is in a closed condition;
    a gasket element mounted along an inner peripheral portion of the at least one door and configured to adhere to a corresponding portion of the cabinet when the at least one door is in the closed condition so as to prevent air in the at least one storage compartment from leaking out of the at least one storage compartment;
    a refrigeration circuit comprising at least one evaporator associated with said at least one storage compartment;
    a control unit configured to control operation of the refrigerating appliance;
    at least one fan, configured to promote heat exchange between said at least one evaporator and the at least one storage compartment, said at least one fan being further configured to be switched between a first operative condition in which said at least one fan is commanded to rotate, and a second operative condition in which said at least one fan is commanded to not rotate; and
    a MEMS pressure sensor configured to measure the pressure inside said at least one storage compartment and in signal communication with the control unit for providing a pressure signal proportional to the measure of the pressure inside said at least one storage compartment,
    wherein the control unit is configured to control the operation of the refrigerating appliance in function of said pressure signal received when said at least one fan is in the first operative condition, and
    wherein the control unit is configured to assess gasket element faults causing air leakages in function of said pressure signal received when said at least one fan is in the first operative condition.

2. The refrigerating appliance of claim 1, wherein said pressure sensor is an absolute pressure sensor.

3. The refrigerating appliance of claim 1, wherein the at least one fan is in signal communication with the control unit, preferably the control unit being configured to set a rotation speed of the at least one fan in function of said pressure signal.

4. The refrigerating appliance of claim 3, wherein the control unit is configured to estimate an air flow rate of said at least one fan in function of said pressure signal.

5. The refrigerating appliance of claim 3, wherein the control unit is configured to control said at least one fan so as to:
    increase the rotation speed of the at least on fan if the pressure signal is below a pressure threshold value;
    decrease the rotation speed of the at least on fan if the pressure signal is above said pressure threshold value.

6. The refrigerating appliance of claim 1, wherein the refrigeration circuit further comprises a compressor for causing refrigerant to flow in the refrigeration circuit through the at least one evaporator, the control unit being in signal communication with the compressor and configured to control the refrigerant flow rate of the compressor in function of said pressure signal.

7. The refrigerating appliance of claim 6, wherein the control unit is configured to control the refrigerant flow rate of the compressor by adjusting a duty cycle or a speed of the compressor in function of said pressure signal.

8. The refrigerating appliance of claim 6, further comprising a temperature sensor configured to measure the temperature inside said at least one storage compartment and provide a corresponding measured temperature value proportional to the measure of the temperature inside said at least one storage compartment, the control unit being further configured to control the refrigerant flow rate of the compressor in function of said pressure signal and in function of the measured temperature value.

9. The refrigerating appliance of claim 8, wherein the control unit is configured to control the refrigerant flow rate of the compressor in function of:
said pressure signal, and
a comparison between the measured temperature value and a target value.

10. The refrigerating appliance of claim 8, wherein the control unit is configured to increase the refrigerant flow rate of the compressor if both the two following conditions are verified:
the measured temperature value is higher than a target value, and
an estimated air flow rate of the at least one fan is equal to a target air flow rate.

11. The refrigerating appliance of claim 8, wherein the control unit is configured to decrease the refrigerant flow rate of the compressor and increase the rotation speed of the at least one fan if both the two following conditions are verified:
an estimated air flow rate of the at least one fan is lower than a target air flow rate, and
the measured temperature value is equal to a target value.

12. The refrigerating appliance of claim 8, wherein the control unit is configured to decrease the refrigerant flow rate of the compressor if both the two following conditions are verified:
the measured temperature value is lower than a target value, and
an estimated air flow rate of the at least one fan is equal to a target flow rate.

13. The refrigerating appliance of claim 1, further comprising at least one defrost heater, the control unit being in signal communication with the defrost heater and configured to control the defrost heater in function of said pressure signal.

14. The refrigerating appliance of claim 13, wherein the control unit is configured to activate the at least one defrost heater for a corresponding period of time, the control unit being configured to:
increase the duration of said corresponding period of time if the pressure signal is indicative of a decrease in the pressure inside said at least one storage compartment;
decrease the duration of said corresponding period of time if the pressure signal is indicative of an increase in the pressure inside said at least one storage compartment.

15. The refrigerating appliance of claim 1, wherein the control unit is configured to assess fail conditions of the at least one fan in function of said pressure signal received when said at least one fan is in the first operative condition.

16. The refrigerating appliance of claim 1, wherein said at least one fan is configured to be switched between the first operative condition and the second operative condition by the control unit or by a test unit external to the refrigerating appliance.

17. The refrigerating appliance of claim 1, wherein said at least one storage compartment comprises a fresh food compartment and a freezer compartment, said pressure sensor being located inside the fresh food compartment or said freezer compartment.

18. The refrigerating appliance of claim 1, wherein the control unit is configured to assess said gasket element faults if the pressure signal decreases toward a value corresponding to an external ambient pressure.

19. A method for operating a refrigerating appliance, the refrigerating appliance comprising:
a control unit configured to control operation of the refrigerating appliance;
at least one storage compartment for storing goods to be refrigerated;
a cabinet enclosing said at least one storage compartment;
at least one door configured to provide access to said at least one storage compartment when the at least one door is in an open condition and to prevent access to said at least one storage compartment when the at least one door is in a closed condition;
a gasket element mounted along an inner peripheral portion of the at least one door and configured to adhere to a corresponding portion of the cabinet when the at least one door is in the closed condition so as to prevent air in the at least one storage compartment from leaking out of the at least one storage compartment;
a refrigeration circuit comprising at least one evaporator associated with said at least one storage compartment;
at least one fan, configured to promote heat exchange between said at least one evaporator and the at least one storage compartment, said at least one fan being further configured to switch between a first operative condition in which said at least one fan is commanded to rotate, and a second operative condition in which said at least one fan is commanded to not rotate; and
a MEMS pressure sensor configured to measure the pressure inside said at least one storage compartment for providing a pressure signal proportional to the measure of the pressure inside said at least one storage compartment, the method comprising:
having the at least one fan in said first operative condition;
having the MEMS pressure sensor provide said pressure signal to the control unit;
having the control unit control the operation of the refrigerating appliance in function of the pressure signal received from the MEMS pressure sensor when the at least one fan is in the first operative condition; and
having the control unit assess gasket element faults causing air leakages in function of said pressure signal received when said at least one fan is in the first operative condition.

* * * * *